United States Patent [19]
Nakamura

[11] Patent Number: 6,031,936
[45] Date of Patent: Feb. 29, 2000

[54] HANDWRITING DETECTING AND STORING APPARATUS

[75] Inventor: Hiroki Nakamura, Kyoto, Japan

[73] Assignee: Yashima Electric Co., Ltd., Kyoto, Japan

[21] Appl. No.: 09/014,595

[22] Filed: Jan. 28, 1998

[51] Int. Cl.[7] .............................. G06K 9/00; G06K 9/02
[52] U.S. Cl. ..................... 382/187; 382/181; 382/188; 382/314
[58] Field of Search .................................. 382/181, 187, 382/188, 312, 314

[56] References Cited

U.S. PATENT DOCUMENTS

| | | | |
|---|---|---|---|
| 4,070,649 | 1/1978 | Wright, Jr. et al. | 382/188 |
| 5,215,397 | 6/1993 | Taguchi et al. | 382/188 |
| 5,294,792 | 3/1994 | Lewis et al. | 250/221 |
| 5,533,141 | 7/1996 | Futatsugi et al. | 382/188 |
| 5,748,808 | 5/1998 | Taguchi et al. | 382/312 |
| 5,774,602 | 6/1998 | Taguchi et al. | 382/188 |
| 5,850,058 | 12/1998 | Tano et al. | 382/188 |

FOREIGN PATENT DOCUMENTS 507269   10/1992   European Pat. Off. .
693739   1/1996   European Pat. Off. .

OTHER PUBLICATIONS

Copy of EP Search Report & Annex No. 98101554 dated Apr. 24, 1998.

*Primary Examiner*—Phuoc Tran
*Assistant Examiner*—Daniel G. Mariam
*Attorney, Agent, or Firm*—Smith, Gambrell & Russell, LLP

[57] ABSTRACT

A handwriting detecting and storing apparatus comprises a lens having a cone shape at front-most position of a lens system which introduces handwriting image to image pick up means such as a charge coupled device or the like, and a pen shaft provided at a center of the lens having a cone shape, and wherein an optical axis of the lens system, an optical axis of the lens having a cone shape and a central axis of the pen shaft are coincident with one another, so that a writing operation is performed using a writing device, handwriting image is picked up and picked up handwriting information is stored therein. The apparatus decreases handwriting image which is hidden by an edge section of the writing device as little as possible, and obtains handwriting information within a region of a recording face accurately and with a low cost, the region corresponding to a position just below the leading edge of the writing device and a neighboring region with respect to the position.

5 Claims, 6 Drawing Sheets

HANDWRITING DETECTING AND STORING APPARATUS

BACKGROUND OF THE INVENTION

The present invention relates to a handwriting detecting and storing apparatus. More particularly, the present invention relates to a handwriting detecting and storing apparatus which records, takes into and stores writing which has been written on a paper or the like using a writing device.

RELATED ART

In the past, a handwriting detecting and storing apparatus has been known (refer to, for example, Japanese Patent Publication No. Hei 5-278390, Japanese Patent Laid-Open Publication No. Hei 7-287635, Japanese Patent Laid-Open Publication No. Hei 8-30370, Japanese Patent Laid-Open Publication No. Hei 8-58286, Japanese Patent Laid-Open Publication No. Hei 8-129443). A conventional handwriting detecting and storing apparatus comprises, in its case body, a writing device (a ball point pen or the like) for writing on a recording medium such as a paper, and an image pick up means, such as a CCD (charge coupled device), for picking up an image corresponding to a predetermined extent of the recording medium which includes a leading edge of the writing device and handwriting information on the recording medium. A conventional handwriting detecting and storing apparatus also includes a lens system mainly comprising convex lenses for introducing the image of the predetermined extent of the recording medium to the image pick up means, a storage means (i.e., a storage device) for storing image information which is picked up by the image pick up means, and a power supply section (i.e., a battery) for driving the image pick up means and the storage means.

For example, the handwriting detecting and storing apparatus 1 illustrated in FIG. 6 comprises, within a case body 1a having a pencil shape, a pen stylus 2 (such as a ball point pen or the like), a lends system (an ordinary convex lens) 3, a CCD 4 as an image pick up means, a printed circuit board 24 on which electric circuitry including an LSI (large scale integration) chip and the like is mounted, and a unit 6 which houses a memory and a battery therein. The shape of the lens system 3 in FIG. 6 schematically illustrates a light path only. The shape does not represent the actual shape of the lens itself.

When the handwriting detecting and storing apparatus 1 is employed, handwriting information on a paper (or other writing surface) 25 is imaged on the CCD 4 by the lens system 3, and this handwriting image is then stored in the memory.

The central axis of the writing device and the optical axis of the lens system are coincident to one another in a handwriting detecting and storing apparatus such as that illustrated in FIG. 6. Therefore, an edge section (actually, the rear edge section which is nearer to the lens system) of the writing device appears as a circular shadow at the central section of the picked up image, so that any handwriting information corresponding to the circular shadow region is hidden {refer to view (b) in FIG. 1}, depending upon the arrangement of the central axis and the optical axis, when the writing surface is optically imaged. As a result, it is impossible to pick up portions of the handwriting on the writing surface due to the existence of the circular region, which portions are just below a leading edge of the writing device and a neighboring region with respect to the leading edge of the writing device.

When a handwriting detecting and storing apparatus including a conventional lens system is employed, an image on a writing surface is picked up by an angle of view to some degree, and an interfering object (such as a pen stylus) exists between the lens system and a subject (such as a writing face). Therefore, a trade-off is generated such that an obscured portion becomes greater the more the interfering object is near the lens system the more, the obscured portion being a portion in which the subject (such as a handwriting) is hidden (masked) by the interfering object. Further, the pen stylus should be lengthened its length for increasing a writable quantity of one pen stylus. When the pen stylus is lengthened, an obscured portion becomes greater the more the pen stylus is lengthened the more, the obscured portion being a portion in which the subject (such as handwriting is hidden by the pen stylus. That is, the trade-off becomes remarkable.

Therefore, a technical adjust becomes necessary, to estimate the obscured portion of the handwriting information which is just below or neighboring the leading edge of the writing device based upon the remaining portion of the handwriting which can be imaged. This technical adjustment typically requires image processing apparatus, such as a computer, which increases the cost of the handwriting detecting and storing apparatus.

The present invention was made in view of the above problems.

It is an object of the present invention to provide a handwriting detecting and storing device which overcomes the problem due to the trade-off. That is, it is an object of the present invention to provide a handwriting detecting and storing apparatus for decreasing the portion of handwriting image which is obscured by a shadow of the edge section of the writing device as much as possible, and for obtaining the handwriting information from a writing surface with high accuracy and a low cost.

SUMMARY OF THE INVENTION

A handwriting detecting and storing apparatus according to the present invention comprises, within a case body, a writing device for performing writing on a recording medium, image pick up means for picking up a predetermined extent of the recording medium which extent includes a leading edge of the writing device and handwriting information, a lens system for introducing an image of the predetermined extent of the recording medium to the image pick up means, storage means for storing image information which is picked up by the image pick up means, and a power supply section for supplying power to the image pick up means and the storage means, wherein the lens system includes a lens having a cone shape at a frontmost side thereof.

When the handwriting detecting and storing device is employed, the lens having a cone shape reduces the size of the shadow region at a central portion of the picked up image corresponding to the leading edge of the writing device. The quantity of imaged handwriting information is thus increased due to the decrease in the portion of handwriting which is hidden by the shadow region. Thus accuracy in the handwriting information, reproducibility of the handwriting and the like are improved with a low cost. The reason for the above operation is that a light beam from the subject (the writing face) is refracted by lens having a cone shape so that a light beam from a neighboring region of the subject with respect to a position which is just below the leading edge of the writing device becomes possible to incident to the image pick up means.

However, an image including handwriting is stored as a deformed image. The image is deformed at a portion which corresponds to the region of the writing surface neighboring a position which is just below the leading edge of the writing device when the lens having a cone shape is employed, while an image is not deformed a conventional lens system is employed. To account for the deformation in a picked up image, it is sufficient to provide a correction means for correcting the region of the image neighboring the shadow region caused by the writing device (the rear side edge section of the writing device near the lens, in actuality).

When the handwriting information is to be reproduced using an image processing apparatus such as a computer or the like, the deformed image corresponding to the region neighboring the position which is just below the leading edge of the writing device can be accurately reproduced by applying a correction processing, because the characteristics of the lens having a cone shape are known and because the shadow region is small.

PREFERRED EMBODIMENTS OF THE PRESENT INVENTION

Hereinafter, referring to the attached drawings, we explain the present invention in detail.

Figure 1:
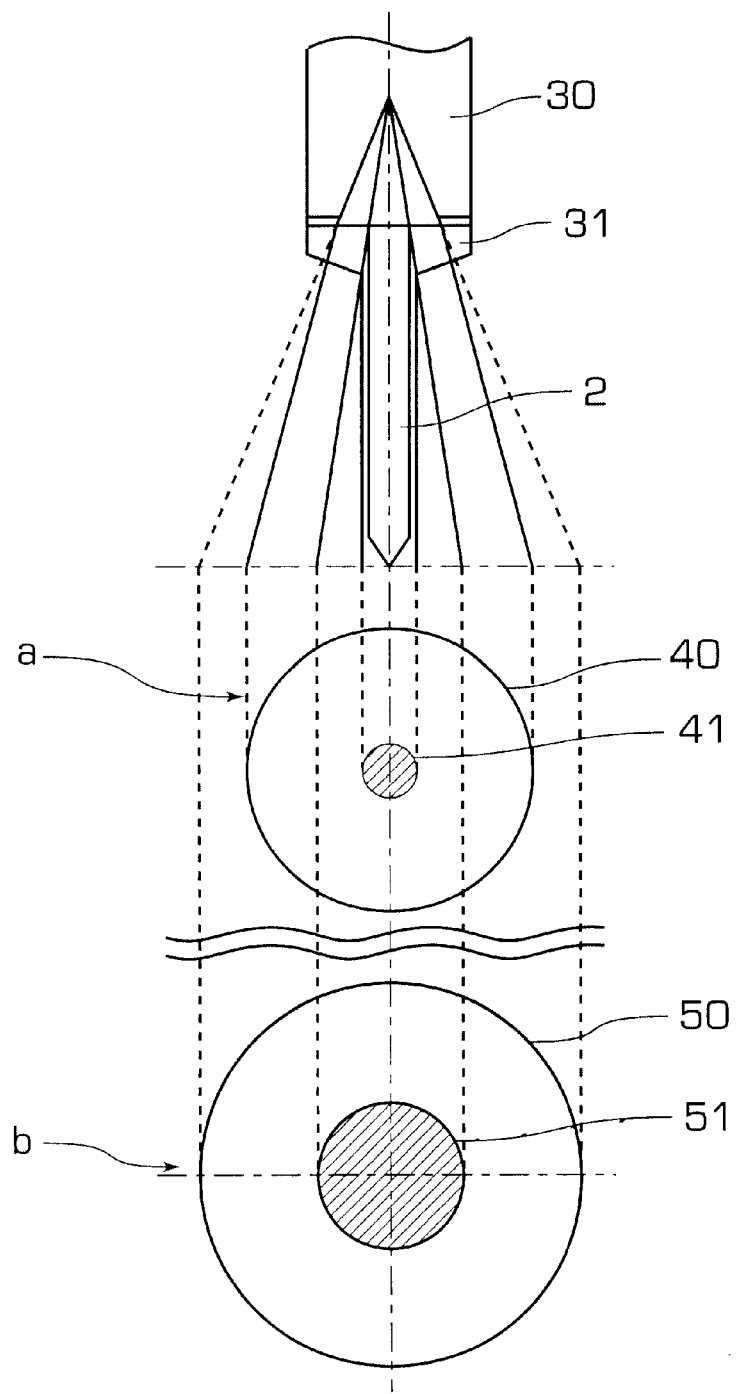
FIG. 1 is a diagram useful in understanding a relationship between a leading edge section of a handwriting detecting and storing apparatus which employs a lens having a cone shape, a region of a field of view a which is picked up by the handwriting detecting and storing apparatus, and a region of a field of view b which is picked up by a handwriting detecting and storing apparatus which does not employ a lens having a cone shape.

FIG. 1 illustrates a region of a field of view a which is picked up by the handwriting detecting and storing apparatus according to the present invention, and a rigged of a field of view b which is picked up by a handwriting detecting and storing apparatus which does not employ a lens having a cone shape, the region of a field of view b being illustrated as a comparison example.

As is apparent from FIG. 1, a lens 31 having a cone shape is disposed at the frontmost side of a lens system 30 which introduces a handwriting image from a writing surface to a CCD. A pen stylus 2 is provided at the center of the lens 31. Further, the optical axis of the lens 31 having a cone shape, the optical axis of the lens system 30 and the central axis of the pen stylus 2 are coincident to one another so that the leading edge of the pen stylus 2 appears as a circular shadow 41 at a center of a field of view 40 which is picked up by the CCD.

The field of view 40 is smaller than the field of view 50 to some degree in FIG. 1, the field of view 40 being picked up by using the lens 31 having a cone shape while the field of view 50 is picked up without using the lens 31 having a cone shape. The reason for this is that angles of view in FIG. 1 are determined to be the same as one another for comparison. But, the field of view 40 can be enlarged to have the same size as the field of view 50 without varying the size of the shadow region 41 by increasing the angle of view. When the field of view 40 is enlarged in size, the shadow region 41 at the center of the field of view 40 is still remarkably smaller than the shadow region 51 at the center of the field of view 50, so the handwriting image hidden by the shadow region 41 is decreased and a quantity of stored handwriting information is increased so that the handwriting of the writing surface is accurately obtained. Furthermore, the cost of the handwriting detecting and storing apparatus is suppressed because the apparatus requires only the lens 31 having a cone shape in addition to the conventional mechanical arrangement.

Figure 2:
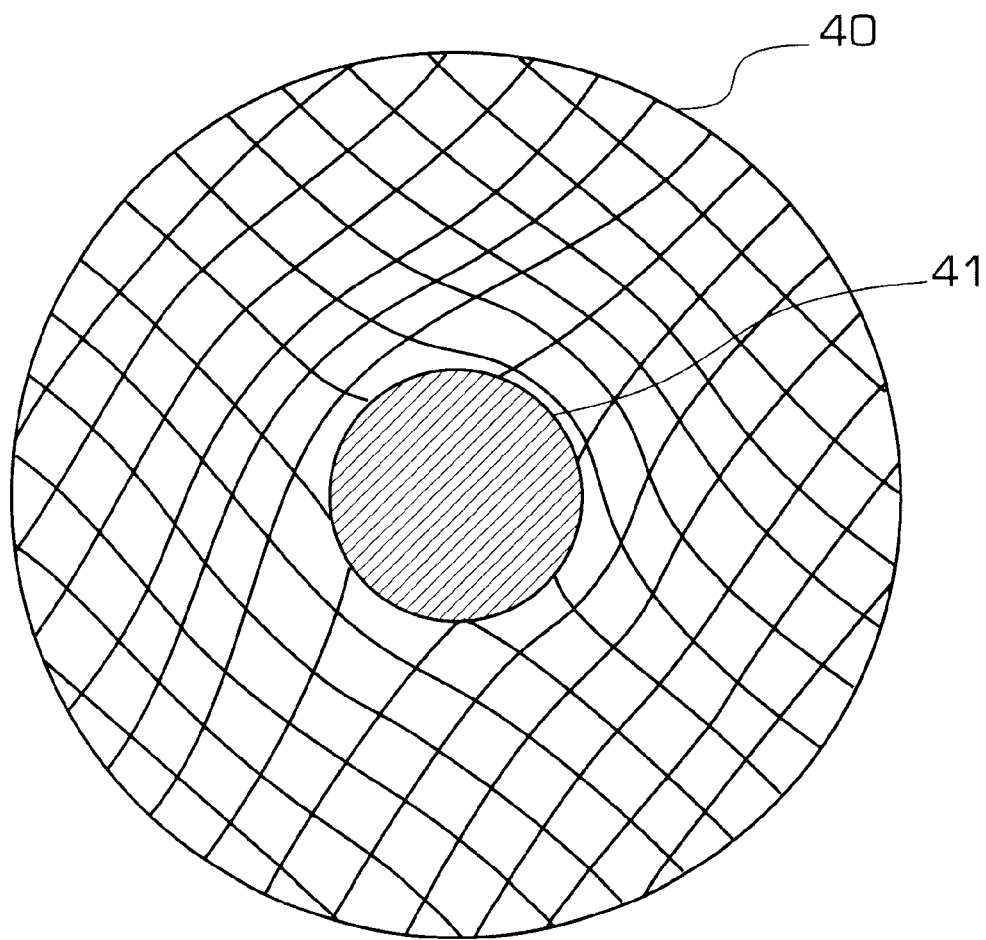
FIG. 2 is a diagram illustrating an image which is picked up by a handwriting detecting and storing apparatus according to the present invention.
Figure 3:
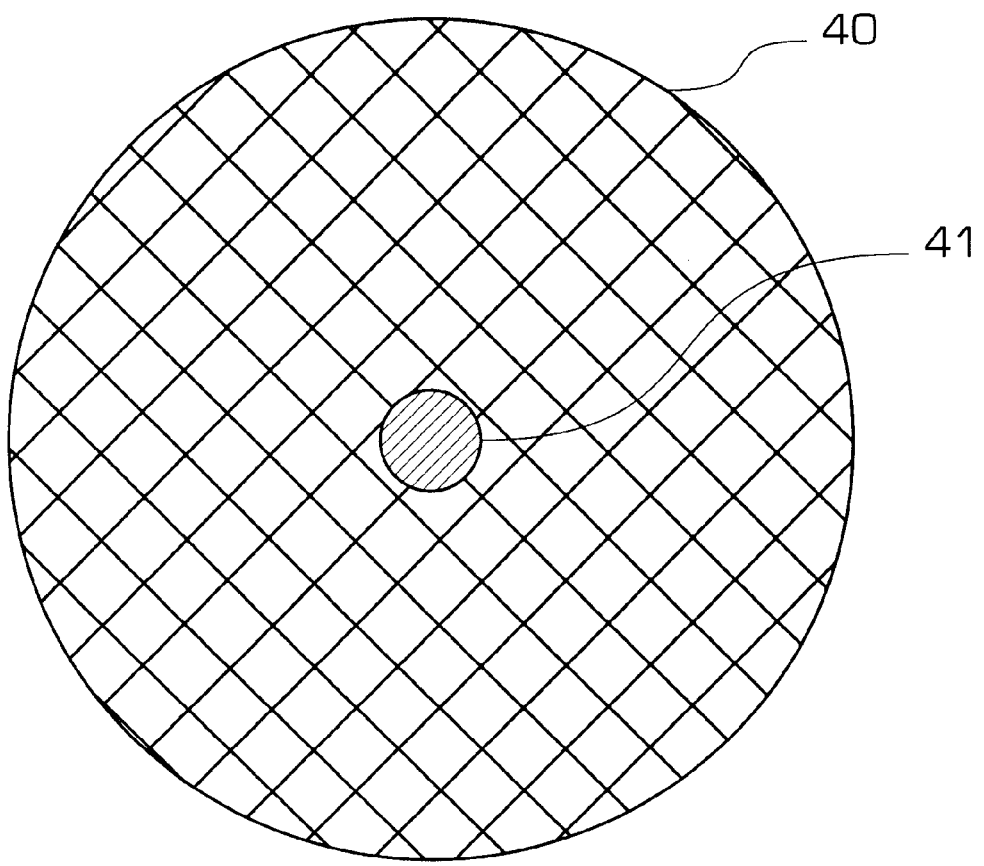
FIG. 3 is a diagram illustrating an image in which the deformation of the image illustrated in FIG. 2 has been corrected.

An image within the picked up field of view 40 is illustrated in FIG. 2 (the image is an image in which a cross-sectioned paper is picked up). The image is stored as an image which includes deformed writing within a region neighboring the point just below the leading edge of the pen stylus 2 when no correction processing is applied. To correct for the deformation, it is sufficient that the deformed region of the image is subjected to image processing and is corrected by a correction means. By applying the correction processing, an accurate handwriting with no deformations included in the region neighboring the shadow region 41 can be reproduced, as is illustrated in FIG. 3.

Figure 4:
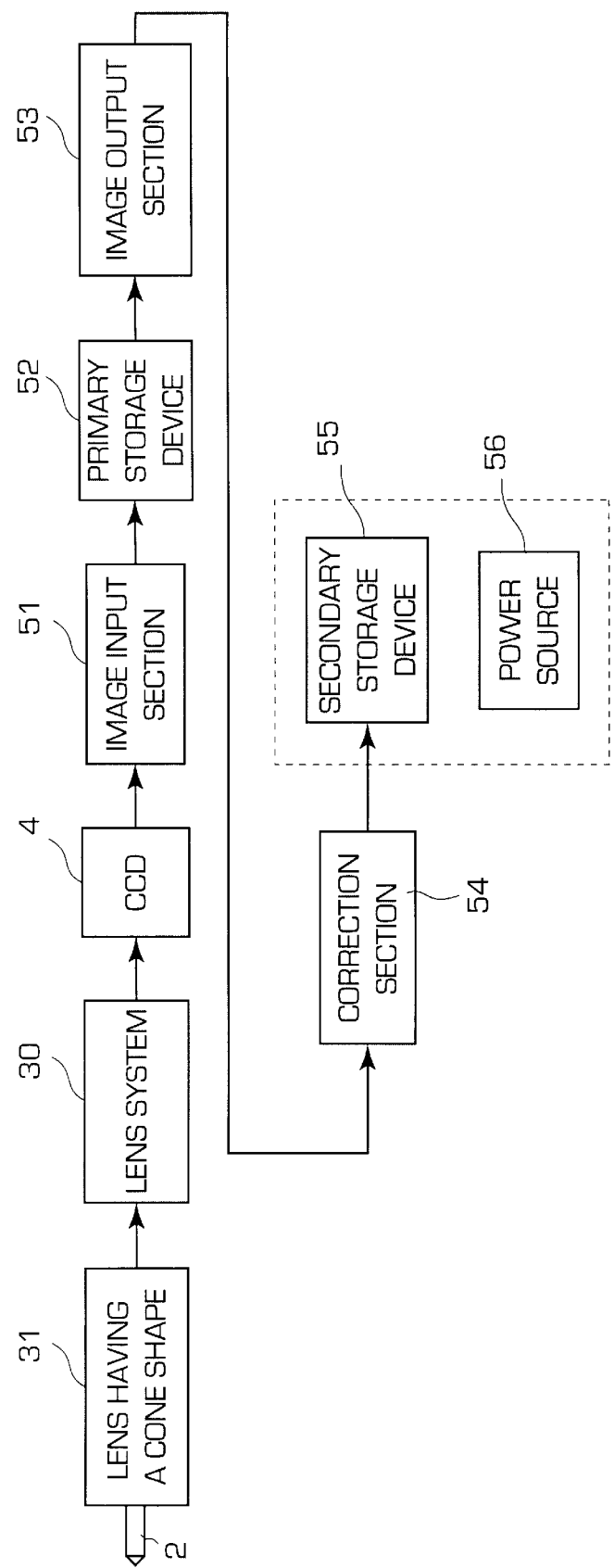
FIG. 4 is a block diagram functionally illustrating a handwriting detecting and storing apparatus.

FIG. 4 is a block diagram functionally illustrating a handwriting detecting and storing apparatus.

The handwriting detecting and storing apparatus includes a lens 31 having a cone shape, a lens system 30, a CCD 4, an image input section 51, a primary storage device 52, an image output section 53, a correction section 54, a secondary storage device 55, and a power source (i.e., a battery) 56.

A handwriting on a recording medium is imaged on the CCD 4 through the lens 31 and the lens system 30. The imaging operation is performed at every predetermined interval, for example. The image is then stored by the primary storage device 52 through the image input section 51. The image is supplied to the correction section 54 through the image output section 53. The image is corrected its deformations by the correction section 54. The corrected image is then stored by the secondary storage device 55. Thereafter, the images are read out from the secondary storage device 55. The original handwriting is reproduced based upon one or more images.

The image output section 53, the correction section 54, and the secondary storage device 55 may be provided separately from the handwriting detecting and storing apparatus 1. Further, the secondary storage device 55 and the power source 56 may be provided to the handwriting detecting and storing apparatus in a removable manner.

Figure 5:
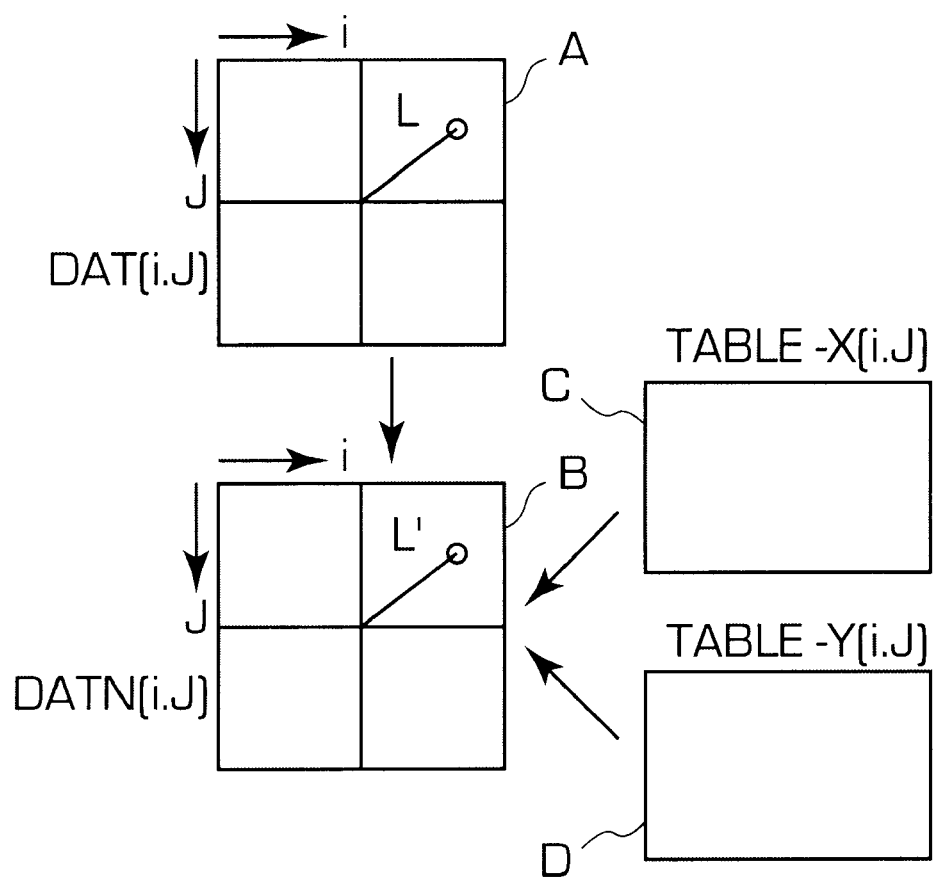
FIG. 5 is a diagram useful in understanding a correction operation.

FIG. 5 is a diagram useful in understanding a correction operation.

The correction operation is performed by using a read out image, and contents of two tables. In FIG. 5, the read out image A is represented which includes a straight line having a length of L, and the corrected image B is represented which includes a straight line having a length of L'. One table C includes magnification factors and/or reduction factors for i-coordinates direction. The other table D includes magnification factors and/or reduction factors for j-coordinates direction. The factors of the both tables are previously determined for every i- and j-coordinates depending upon the characteristics of the lens 31 having a cone shape.

When coordinates of one point within the read out image A is expressed as DAT(i,j), coordinates of corresponding point within the corrected image B is expressed as DATN (i,j), magnification factors and/or reduction factors for i-coordinates direction of corresponding point is expressed as table-X(i,j), and magnification factors and/or reduction factors for j-coordinates direction of corresponding point is expressed as table-Y(i,j), the coordinates DATN(i,j) is expressed by the following equation.

$$DATN(i,j)=DAT\{table\text{-}X(i,j), table\text{-}Y(i,j)\}$$

The equation represents the correction operation. This is, the operation represented by the equation is performed for every point, deformation due to the lens 31 having a cone shape are corrected so that the image illustrated in FIG. 2 is corrected to be the corrected image illustrated in FIG. 3, for example.

Figure 6:
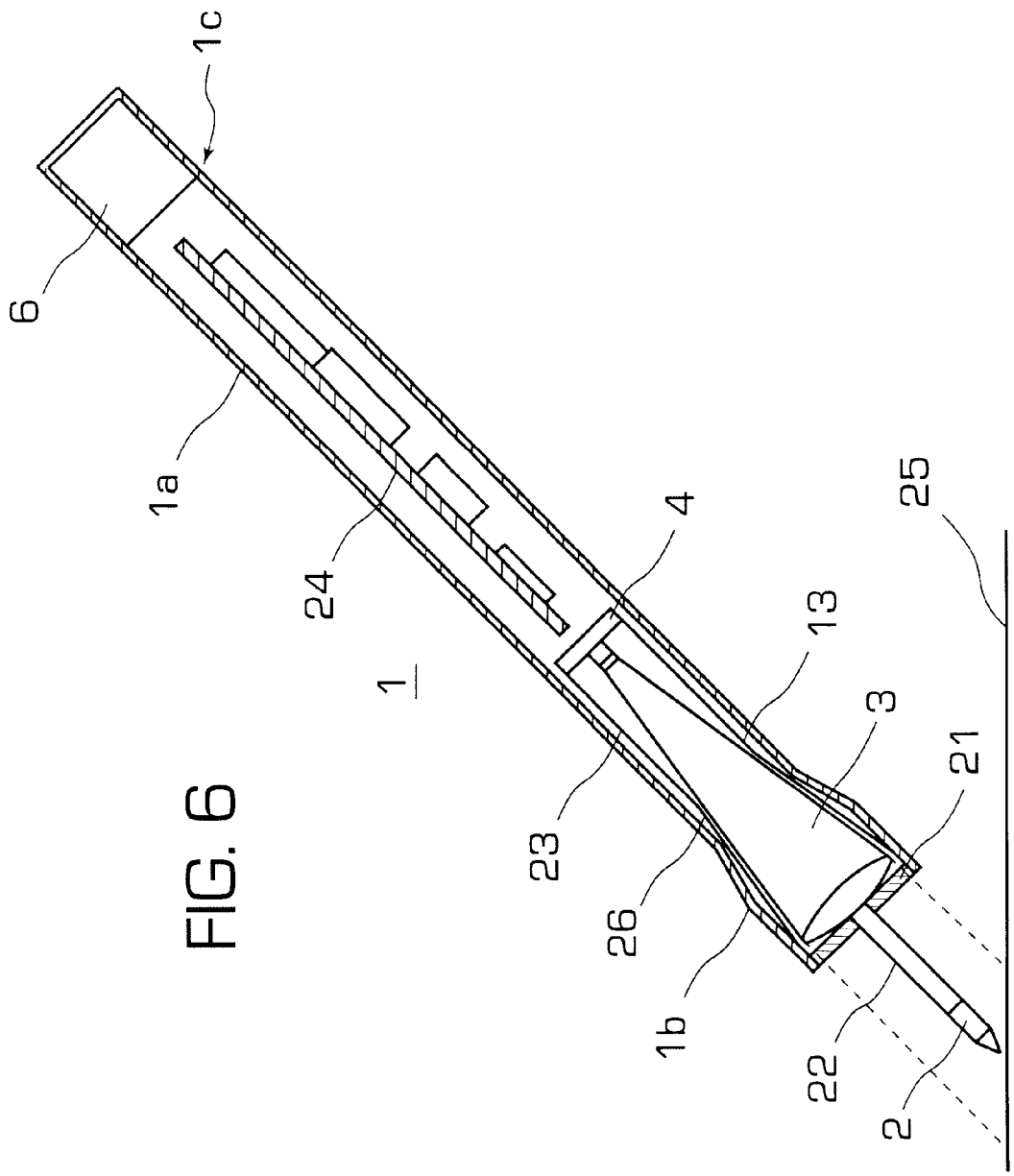
FIG. 6 is a cross sectional view illustrating a conventional handwriting detecting and storing apparatus.

The handwriting detecting and storing apparatus including the lens 31 having a cone shape may have the same arrangement as the handwriting detecting and storing apparatus illustrated in FIG. 6, because the arrangement, other than the lens 31 having a cone shape, has no difference from a conventional handwriting detecting and storing apparatus. The handwriting detecting and storing apparatus illustrated in FIG. 6 was described in the related art section, but is also described in detail below.

The handwriting detecting and storing apparatus 1 having a pencil shape has a case body 1a with a circular rod shape. A leading edge section 1b of the case body 1a is enlarged in diameter to some degree. A pen shaft (stylus) holding plate 21 having a transmissivity to light is provided at the leading edge section 1b of the case body 1a. A pen shaft (stylus) holder 22 for holding a pen shaft (stylus) 2 projects from a center of the pen shaft holding plate 21.

A usual lens system (i.e., with convex lenses) 3 (the lens system 3 represents an optical path schematically in FIG. 4) is disposed within the case body 1a at an inner side position with respect to the pen shaft holding plate 21. A CCD 4 is disposed in a neighboring condition at an inner side edge section of the lens system 3. The optical axis of the lens system 3 is coincident with the central axes of the pen shaft 2 and the pen shaft holder 21. The CCD 4 is disposed on the optical axis.

The pen shaft holding plate 21, the pen shaft 2, the pen shaft holder 22, the lens system 3 and the CCD 4 are fixed in one body to an inner case 23. The inner case 23 is slightly slidable along a direction which is parallel to the optical axis, i.e., to an inner side of the case body 1a, due to a writing pressure during a writing operation. When the inner case 23 slides along this direction and moves the inner side of the case body 1a due to the writing pressure during a writing operation, a stress sensor 13 is pressed by the inner case 23 so that it is detected that writing is being carried out.

Further, a printed circuit board 24 is disposed within the case body 1a. Electric circuitry including a LSI chip and the like is mounted on the printed circuit board 24. The CCD 4 is electrically connected to the electric circuitry so that handwriting signals (signals representing a handwriting) detected by the CCD 4 are taken by the electric circuitry. A unit 6 is provided at a rear section 1c of the case body 1a, the unit 6 including therein a storage device for storing detected handwriting information and a battery.

Further, a sensor (e.g., a stress sensor) 13 is provided between an inner wall of the case body 1a and the inner case 23, the sensor detecting a condition in which a writing operation is being carried out. The stress sensor 13 is pressed by the inner case 23 when the inner case 23 moves slightly to the inner side of the case body 1a by the writing pressure during a writing operation, so that a condition is detected based upon the pressure force in which condition a writing operation is being carried out. A start switch 26 is provided at a portion of the case body 1a which is positioned on an outer side with respect to the stress sensor 13. The power for the handwriting detecting and storing apparatus 1 is turned ON/OFF by operating the start switch 26.

When a lens having a cone shape is incorporated in the handwriting detecting and storing apparatus 1, a lens 31 having a cone shape is disposed in front of the lens system 3 instead of the pen shaft holding plate 21, as is illustrated in FIG. 1 and is not illustrated in FIG. 4. The pen shaft 2 (that is, the pen shaft holder 22) is provided at a center of the lens 31 having a cone shape. A correction means comprising, e.g., computer software is further provided. When the above arrangement is employed, a conventional handwriting detecting and storing apparatus 1 is improved to be the handwriting detecting and storing apparatus according to the present invention.

What is claimed is:

1. A handwriting detecting and storing apparatus comprising:
    a case body;
    a writing device for performing writing operation on a recording medium, which device is housed within the case body;
    image pick up means for picking up a predetermined extent of the recording medium, the extent including a leading edge of the writing device and a handwriting, which image pick up means is housed within the case body;
    a lens system for introducing an image of the predetermined extent on the recording medium to the image pick up means, which lens system is housed within the case body;
    storage means for storing image information picked up by the image pick up means, which storage means is housed within the case body; and
    a power supply section for supplying power to the image pick up means and the storage means, which power supply section is housed within the case body; and
    wherein the lens system includes a lens having a cone shape at its frontmost position.

2. A handwriting detecting and storing apparatus as set forth in claim 1, further comprising correction means for correcting deformation of a partial image among an entire image picked up by the image pick up means which partial image is neighboring to a shadow region due to an edge section of the writing device.

3. A handwriting detecting and storing apparatus as set forth in claim 1, wherein an optical axis of the lens having a cone shape and an optical axis of the lens system are coincident with one another.

4. A handwriting detecting and storing apparatus as set forth in claim 1, wherein an optical axis of the lens having a cone shape, an optical axis of the lens system and a central axis of the writing device are coincident with one another.

5. A handwriting detecting and storing apparatus as set forth in claim 1, wherein the writing device is provided through a center of the lens having a cone shape.

* * * * *